United States Patent [19]

Wong

[11] Patent Number: 4,779,522
[45] Date of Patent: Oct. 25, 1988

[54] DRIVE MECHANISM FOR INTERMITTENT SHAFT ROTATION AT IRREGULAR INTERVALS

[76] Inventor: Don M. Wong, 2296 Bunker Hill Dr., San Mateo, Calif. 94402

[21] Appl. No.: 119,358

[22] Filed: Nov. 10, 1987

[51] Int. Cl.$^4$ ............................................. A47J 27/00
[52] U.S. Cl. ........................................ 99/348; 74/436
[58] Field of Search ............... 99/348, 324, 325, 352, 99/407, 409, 326; 222/501, 502; 74/84 R, 436; 426/523

[56] References Cited

U.S. PATENT DOCUMENTS

| | | | | |
|---|---|---|---|---|
| 3,606,526 | 9/1971 | Smith | ................................... | 74/436 |
| 4,606,235 | 8/1986 | Kindt | ................................... | 74/436 |
| 4,649,810 | 3/1987 | Wong | ................................... | 99/326 |
| 4,693,610 | 9/1987 | Weiss | ................................... | 99/348 |

Primary Examiner—Robert W. Jenkins
Attorney, Agent, or Firm—Townsend and Townsend

[57] ABSTRACT

A Geneva drive mechanism for intermittently and selectively rotating one or more drive shafts through indexed positions. A conventional Geneva mechanism is modified to include a drive movable between a non-driving and driving position. When the driver is in its non-driving position, a plurality of Geneva wheels is secured against rotation. When the driver is moved to its driving position, it engages a selected Geneva wheel and rotates the wheel through one indexed position. Meanwhile, any other Geneva wheels remain secured against rotation. A compact gear mechanism is disclosed for coupling the Geneva mechanism and drive motor to a pair of coaxially mounted shafts.

18 Claims, 3 Drawing Sheets

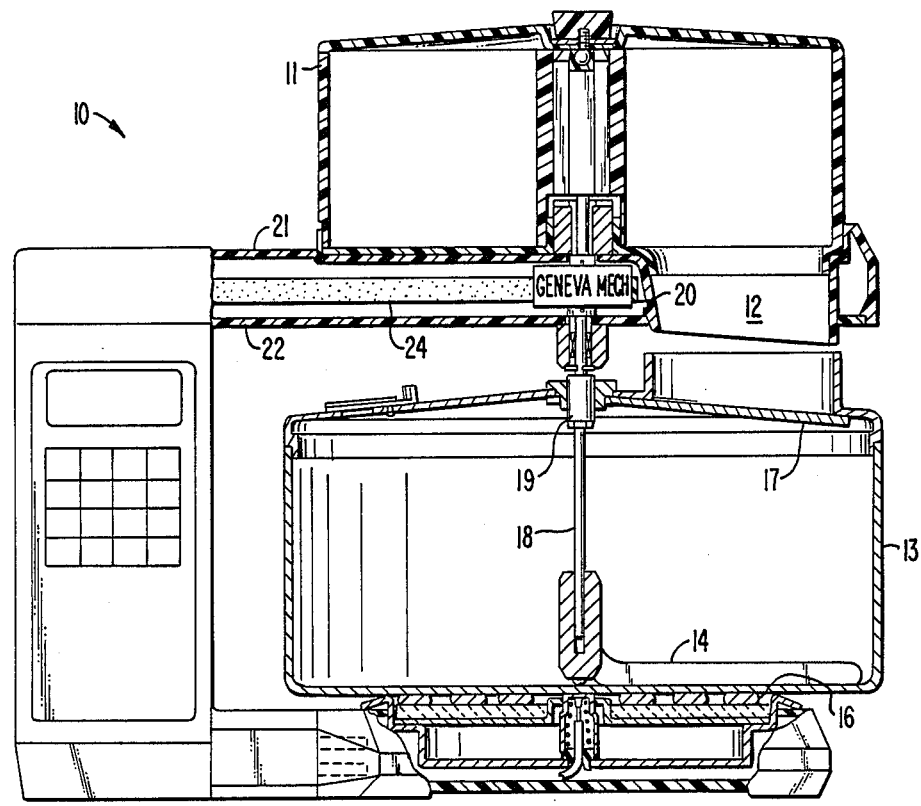
FIG._1.
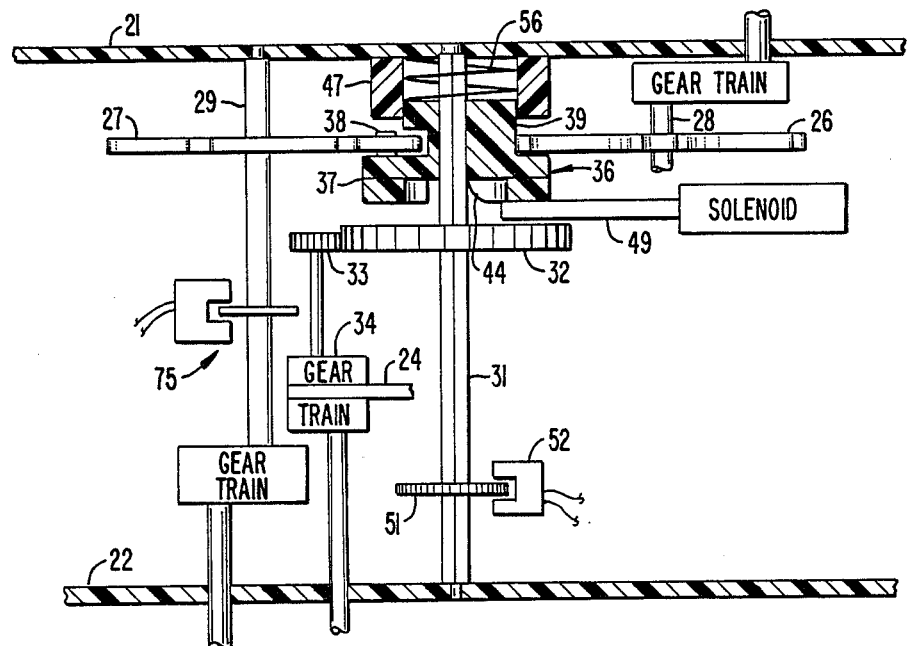
FIG._2.

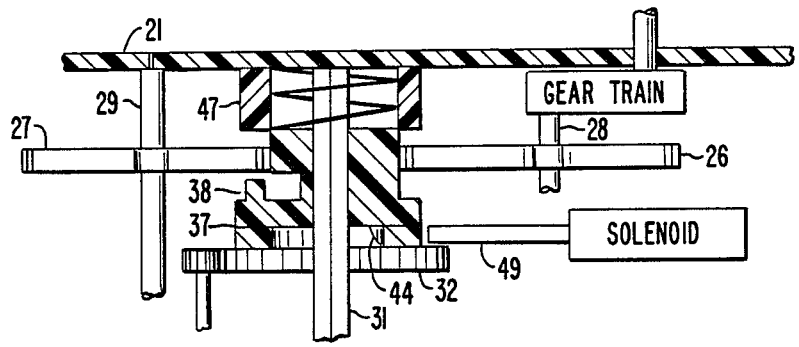
FIG._3.
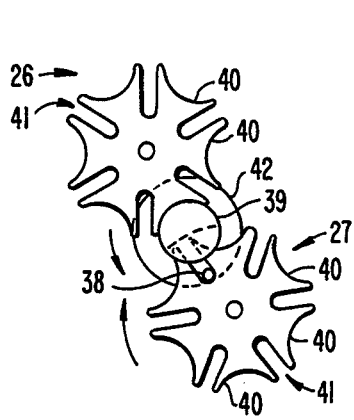
FIG._4.
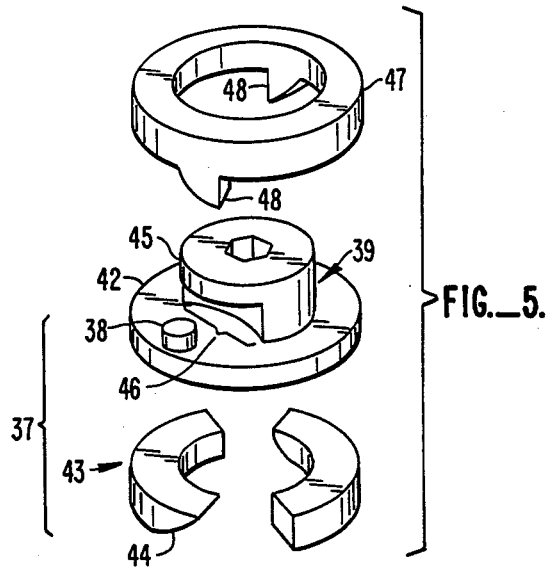
FIG._5.
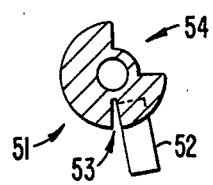
FIG._6.

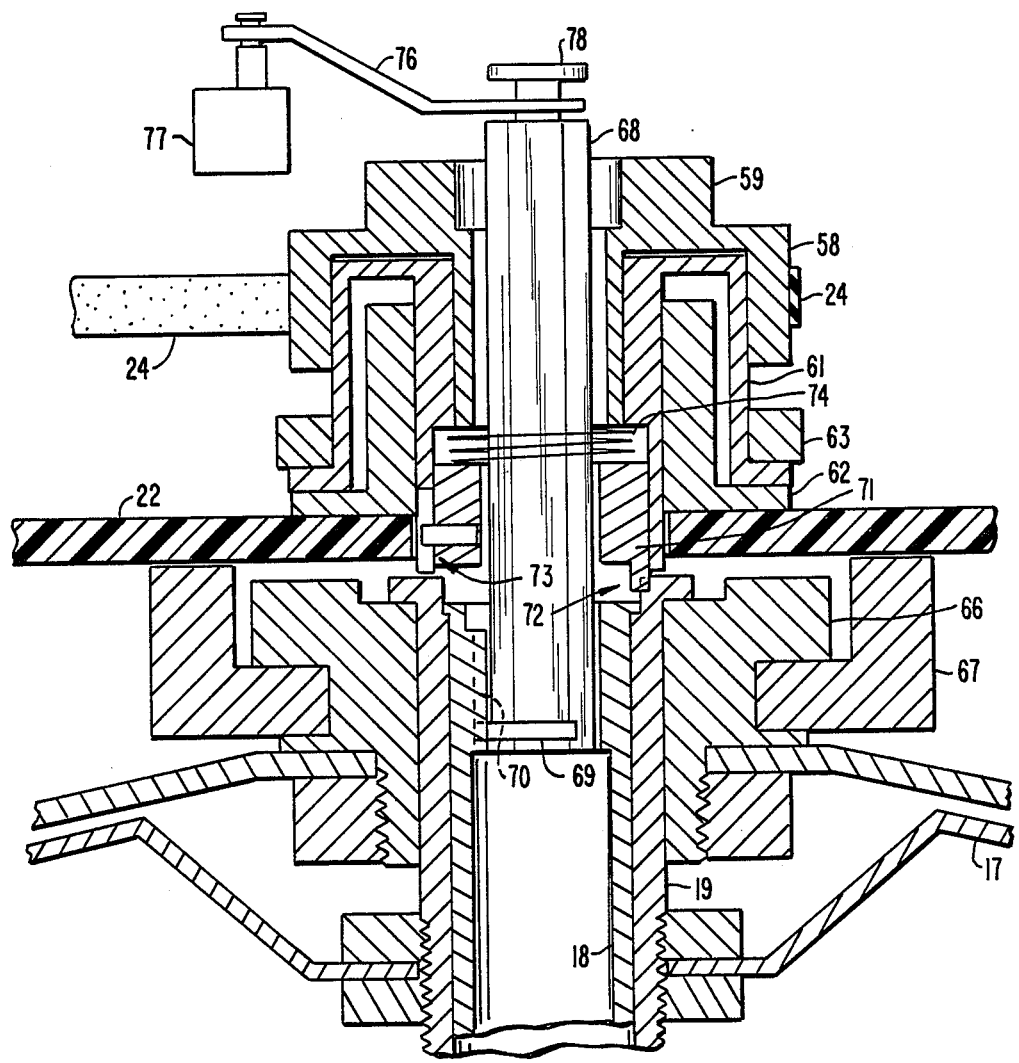
FIG._7.

DRIVE MECHANISM FOR INTERMITTENT SHAFT ROTATION AT IRREGULAR INTERVALS

FIELD OF THE INVENTION

The present invention relates to Geneva drive mechanisms for intermittently coupling a drive motor to one or more drive shafts or the like.

BACKGROUND OF THE INVENTION

U.S. Pat. No. 4,649,810 discloses an automatic cooking apparatus, in which ingredients are automatically dispensed into a cooking vessel and heated, stirred, covered, and uncovered according to a prescribed recipe. In one embodiment of that invention, the ingredients are pre-loaded into a compartmentalized carousel which rotates on command under the control of a microprocessor to bring the appropriate compartment into position for dispensing its ingredients into the vessel. In addition, the apparatus may automatically stir the ingredients in the cooking vessel with a continuous stirring motion for specified periods of time, and the apparatus may rotate a closure member into position to close off the top of the cooking vessel when the recipe calls for covering the vessel.

Thus, the cooking apparatus must drive three shafts at irregular intervals—for the compartmentalized carousel, the stirrer, and the lid—and at least two of these shafts, for the carousel and the lid, are driven through specified angles less than a full rotation. In a commercial embodiment of the apparatus it is desirable to make the apparatus as compact as possible and to keep the cost of manufacture as low as possible. However, known mechanisms for driving the shafts have employed complicated gear mechanisms and/or multiple drive motors.

SUMMARY OF THE INVENTION

The present invention provides a simple and compact mechanism for intermittently and selectively rotating one or more drive shafts. The invention is particularly suited for use in the automatic cooking apparatus of U.S. Pat. No. 4,649,810; however, it may be beneficially applied in other environments as well.

The invention provides a modification to a Geneva drive mechanism enabling that mechanism to be utilized in the above apparatus. A conventional Geneva mechanism typically includes a Geneva wheel, which is mounted on a drive shaft so that it rotates coaxially with the shaft. The Geneva wheel is formed with a plurality of lobes, which are intermittently engaged by a drive pin, which is carried by a rotating wheel generally referred to as a Geneva driver. The present invention modifies the Geneva mechanism of the prior art so as to provide a drive assembly by which the drive pin may be intermittently and selectively, on command, caused to engage one or more Geneva wheels for rotating one or more drive shafts.

Briefly, the drive assembly includes a driver which carries the drive pin for engaging one or more Geneva wheels and a specially formed locking ring for holding the Geneva wheel or wheels in fixed position when they are not being driven. The drive assembly is mounted on a shaft to move between a first, non-driving position and a second, driving position. In the driving position the drive pin engages a lobe of the desired Geneva wheel, causing it to rotate, while any additional Geneva wheel is secured against rotation. In the non-driving position all Geneva wheels are secured against rotation.

In one embodiment of the invention, the drive assembly is moved from the non-driving to the driving position by a cam mechanism, which eliminates the need for a special clutching mechanism. The driver has a surface which is formed to present a cam follower profile. A selectively engageable cam contacts the profile to urge the drive assembly into its driving position. The drive assembly remains in the driving position, so as to drive the selected Geneva wheel, for a duration determined by the cam follower profile.

When used with a single Geneva wheel to drive a single shaft, the invention provides a compact mechanism for rotating the Geneva wheel and its associated drive shaft through a predetermined angle at a time which may be selected at will. When used with more than one Geneva wheel to drive more than one shaft, only a single drive assembly need be used; hence, the invention has the advantage that only a single drive motor need be used, which reduces the cost and contributes to the compactness of the apparatus in which the invention is employed.

The invention has the further advantage that, in addition to selectively rotating shafts through predetermined fixed angles with only a single drive motor, it allows at least one other shaft to be coupled to the same drive motor to be selectively and continuously rotated without interfering with the Geneva mechanism and without significantly reducing the compactness of the mechanism.

A better understanding of the nature and further advantages of the invention will be gained by reference to the following portions of the specification and the drawings.

BRIEF DESCRIPTION OF THE DRAWINGS

FIG. 1 is an elevational view of an automatic cooking apparatus, partly in section, employing the present invention to control the dispensing structure, stirrer, and lid closure.

FIG. 2 is an elevational view of a Geneva mechanism according to the invention, with the Geneva drive assembly in driving position.

FIG. 3 is an elevational view of the Geneva mechanism of FIG. 2 with the drive assembly in non-driving position.

FIG. 4 is a top plan view showing two Geneva wheels according to the invention, one being driven by the rotating drive assembly while the other is secured against rotation.

FIG. 5 is an exploded perspective view of a drive assembly and reset cam mechanism according to the invention.

FIG. 6 is a plan view of a timing disc displaying a pair of timing gaps.

FIG. 7 is a cross-sectional view of a compact gear train for coupling the drive motor and the Geneva mechanism to a pair of rotating shafts, including a mechanism for selectively disengaging one of the rotating shafts.

DETAILED DESCRIPTION OF THE PREFERRED EMBODIMENTS

For purposes of illustration, the invention is described herein as applied to the automatic cooking apparatus depicted in FIG. 1. Those skilled in the art will readily recognize from the description presented here that the invention has application to other fields. Accordingly, it is not intended to limit the invention to the specific embodiment presented here.

FIG. 1 shows a cooking apparatus 10 including a compartmentalized carousel 11, which holds ingredients to be combined according to a specified recipe. The ingredients are dispensed from the carousel under the control of a microprocessor through an aperture 12 and into a cooking vessel 13 below. The apparatus also includes a stirring mechanism 14 which can stir the ingredients in the cooking vessel on command. To dispense the ingredients, the carousel 11 is rotated until the next compartment is in a position of registration with the aperture 12 so that the ingredients fall freely into the cooking vessel. The vessel sits on a heating element 16, which is regulated to control the cooking temperature. For covered cooking, the apparatus includes a closure member or lid blade 17 for closing off the opening in the top of the cooking vessel through which the ingredients are delivered.

Three rotating shafts must be coordinated in the normal operation of the cooking apparatus. The carousel 11 rotates on a first shaft to ring each compartment sequentially into registration with the aperture 12. From time to time the stirrer 14 will be rotated on a second shaft to stir the ingredients in the cooking vessel during cooking. In addition, the lid 16 may be rotated into position to close off the cooking vessel whenever called for by the recipe. The carousel and lid undergo stepwise rotations, at irregular intervals, through predetermined fractions of a revolution, while the stirrer rotates continuously, typically for a specified time, through any number of revolutions until stopped. The present invention provides a low-cost, reliable, and compact mechanism for driving these rotations.

As depicted in FIG. 1, the stirrer 14 and lid blade 17 are rotated by coaxial shafts 18 and 19, respectively. The invention provides an improved Geneva mechanism 20 for controlling these rotations. The Geneva mechanism 20 is housed and supported between upper and lower support plates 21 and 22, and driven by a single motor (not shown) through belt drive 24.

A Geneva drive mechanism according to the invention will now be described with reference to FIGS. 2 and 3. For simplicity of illustration, in FIGS. 2 and 3 the drive shafts and gear trains have been represented in symbolic fashion. Specific embodiments of the gear train coupling mechanisms will be described below.

FIGS. 2 and 3 show Geneva wheels 26 and 27, which are mounted on shafts 28 and 29, respectively. The shafts 28 and 29 are supported by upper and lower support plates 21 and 22 and are coupled to rotate together with their respective Geneva wheels.

Disposed between the rotating shafts 28 and 29 and also supported by upper and lower support plates 21 and 22 is an intermediate, hexagonal shaft 31. The hex shaft 31 carries a torque gear 32, which is keyed to the shaft. The intermediate shaft 31 is coupled to the drive motor. In FIG. 2 this coupling is represented in idealized fashion for the sake of illustration by coupling gear 33, gear train 34, and belt drive 24.

Intermediate shaft 31 also carries a drive assembly, designated generally as 36, which is keyed to rotate with the hex shaft 31 and which is free to slide along the shaft between two positions. The drive assembly 36 includes a driver 37, which has a drive pin 38 for engaging the Geneva wheels 26 and 27. The drive assembly also includes a locking ring 39 for maintaining the Geneva wheels in fixed position when they are not to be rotated.

FIG. 4 provides a top plan view of the Geneva wheels 26 and 27. The Geneva wheels are formed in conventional fashion with a plurality of lobes shaped with locking arcs 40 for engaging the locking ring 39. The lobes are separated by radial slots 41 for receiving the drive pin 38.

FIG. 5 provides an exploded perspective view of the drive assembly showing the driver and locking ring. The driver is comprised of the support disc 42, drive pin 38, and the cam follower, member 43, which is secured to the support disc 42. The underside of the cam follower member 43 is formed to present a cam follower profile 44, as described further below. The support disc 42 carries the drive pin 38 and also carries the locking ring 39, which is formed with an upper portion 45 of generally circular cross section and a lower portion of the same circular cross section, but with a cutout 46 to receive the lobes of the Geneva wheels as the wheels are rotated.

The drive pin 38 is located at the outer periphery of the driver support member 42. The pin 38 is dimensioned to engage the radial slots 41 of the Geneva wheels. The pin is of a height which is preferably less than, but may be roughly equal to, the height of the radial slots in the Geneva wheels. In FIG. 2 the height of pin 38 has been exaggerated for purposes of illustration.

Also shown in FIG. 5 is reset cam support ring 47 carrying reset cam members 48. The operation of the reset cam mechanism will be described below.

The drive assembly 36 has two positions—a lower, non-driving position illustrated in FIG. 3, and a raised, driving position illustrated in FIG. 2. In the specific embodiment illustrated here, the drive assembly 36 is raised to its driving position by a solenoid-actuated plunger 49, which serves as a selectively engageable cam for engaging the cam follower surface 44 of the underside of the drive assembly.

The action of the solenoid in extending or retracting the pin 49 is determined by timing disk 51 and its associated optodetector 52. The timing disk 51 is formed with one or more slots or timing gaps (53 and 54 in FIG. 6) for this purpose.

The drive assembly 36 and its associated timing disk 51 rotate with the torque gear 32. When the timing disk 51 rotates, the microprocessor seeks a positional signal from the optodetector 52. The signal is provided by an LED and detector arrangement for detecting light from the LED passing through a slot in the timing disk 51. Such optodetector arrangements are well known and will not be described further here. The two slots 53 and 54 of the timing disk 51 are of different gap widths. The microprocessor can distinguish the two slots by the size of the gap width.

In the operation of the invention with only a single Geneva wheel, the driver 37 will have only a single cam follower surface. Similarly, for two Geneva wheels, the driver will have two cam follower surfaces separated by short spaces or gaps between them. In the embodiment described here, the driver has two cam follower profiles and the timing disk has the two timing gaps 53 and 54 to distinguish these profiles.

The timing gaps are discriminated as follows. When the leading edge of a gap crosses into the optodetector 52, the microprocessor receives a positional signal that a gap has been detected. When the disk 51 rotates so that the trailing edge of the detected gap reaches the optodetector, light from the LED is blocked by the disk and the positional signal disappears. The microprocessor records the elapsed time to reach the trailing edge of the gap, signified by the cessation of the positional signal. Pre-programmed with the angular velocity of the timing disk, the microprocessor determines the width of the gap and consequently discriminates which gap has been detected. The programming of a microprocessor to perform this function is routine and will not be described herein.

In typical operation, when it is desired to activate, for example, the carousel, the microprocessor turns on the motor, thereby causing the torque gear 32 and timing disk 51 to rotate. The microprocessor looks for the timing gap allocated to the carousel control. For illustration assume this to be the first narrow gap 53 in FIG. 6. For actuation of a second shaft, the role of the timing gaps is reversed. Once the microprocessor detects the first gap, as described above, it issues a command to shut off the motor. The microprocessor then gives a command to activate the solenoid, which extends the plunger 49. The tip of the plunger serves as a cam, which engages the appropriate cam follower surface. The reason that the motor is shut off before the plunger is extended is to allow sufficient response time for the solenoid to extend and stabilize the position of the plunger. At this stage, the tip of the plunger 49 is positioned at the top or beginning of one of the cam follower profiles. As used herein, the top of the profile refers to the highest point of the cam follower surface. (Since the cam follower surface is formed on the underside of the Geneva driver, the profile is in inverted configuration so that the part of the profile first contacted by the plunger 49, referred to here as the "top" of the profile, corresponds to what would conventionally be referred to as the "bottom.") The microprocessor then issues a command to reactivate the motor, causing the drive assembly 36 to rotate and the cam follower surface to ride up on the end of the plunger 49. As a result of this engagement, the whole drive assembly 36 is forced upward on the hex shaft 31 to an upper position determined by the bottom of the cam follower profile.

While the drive asembly is rotating in its upper position, the microprocessor is seeking the trailing edge of the next following timing gap (gap 54 in this example). When the trailing edge of the second gap is found, the microprocessor issues a command to stop the motor. After the motor is stopped a further command is issued to retract the plunger. As before, the motor is stopped to allow sufficient time for the solenoid to operate. The trailing edge of the second gap on the timing disk is positioned to correspond to the completion of one indexed position of the corresponding Geneva wheel. The cam follower profile terminates at this point. The length of the space separating the two cam follower profiles is selected to account for variations in motor speed, inertial effects, and the like, so as to provide sufficient tolerance to retract the plunger before the next profile arrives.

In operation, when it is desired to activate one of the Geneva wheels, the microprocessor gives an appropriate command to activate the motor, seek the timing gap, and extend the plunger, as described above, so as to raise the driver at the appropriate time. The timing with which the driver is raised is such that the drive pin 38 will enter and engage one of the radial slots 41 in the appropriate Geneva wheel. Further rotation of the driver and engagement of the drive pin with the slot causes the Geneva wheel to rotate in the conventional manner. The relative directions of rotation of driver and wheel are indicated by the arrows in FIG. 4.

As seen in FIGS. 2 and 4, the two lobes of the rotating Geneva wheel neighboring the engaged slot 41 pass unobstructed through the cutout region 46 of the locking ring 39. Meanwhile, the circular side of the locking ring engages a locking arc 40 of the other Geneva wheel to hold it in stationary configuration.

The cam follower profile on the underside of the driver is formed so that when the drive pin 38 exits from a radial slot, the driver will be free to drop back to the nondriving position of FIG. 3. As described above, the shape of the profile, and the consequent dropping of the driver, is closely correlated with the position of the trailing edge of the subsequent timing gap so that the solenoid will retract the plunger before the arrival of the next cam profile. With the driver in its lower position, the two Geneva wheels are locked in their last-indexed positions by the fully circular upper portion 45 of the locking ring 39.

In the illustrated embodiment there are three ways in which the drive assembly will drop from its upper position to its lower position. First, it will tend to slide down the intermediate hex shaft 31 at the end of the cam profile under the influence of gravity. Second, the driver is urged downward by a reset spring 56 disposed within the support ring 47. Third, a separate reset cam mechanism is provided to assure reliable functioning of the driver.

In the event of heavy loads, the frictional force between the locking ring 39 and a locking arc 40 of the stationary Geneva wheel may be enhanced. Due to this enhanced frictional force, there may be a tendency for the mechanism to bind. To assure reliability, the apparatus is preferably provided with reset cam member 48 for urging the driver downward. As illustrated in FIG. 2, the cam support ring 47 is secured to the upper support plate 21 and includes two reset cam members opposite one another on the ring. The cam members are positioned so that when the drive pin 38 exits from a radial slot in one or the other Geneva wheel, it engages and follows the cam follower surface defined by the cam member 48, which engagement urges the drive pin and, hence, drive assembly downward. Each Geneva wheel has its own associated cam follower 48.

In a configuration having only one Geneva wheel, the reset cam follower member may alternatively be located on the upper surface of the driver itself. In this configuration, the underside of a lobe of a Geneva wheel serves as a cam engaging the cam follower surface and urging the driver downward.

A convenient embodiment of a gear mechanism for coupling the Geneva drive mechanism to the drive motor and to a pair of coaxial shafts will now be described with reference to FIG. 7. The main drive pulley 58 is driven through belt 24 by the drive motor (not shown). Coupled to the drive pulley 58 is a torque coupling gear 59. As shown in FIG. 7, torque coupling gear 59 rides above the main drive pulley 58 and is formed as an integral unit with drive pulley 58. The torque coupling gear 59 serves the role of the torque coupling gear 33 shown in the simplified drawings of FIGS. 2 and 3 and may be coupled directly to the torque gear 32 of those figures for driving the intermediate hex shaft 31. The drive pulley 58 rides on a doubly cylindrical bearing member 61, which provides the bearing surface for the drive pulley 58. The doubly cylindrical bearing member 61 rides on a journal support bearing 62, which is fixed to the lower support plate 22 and which extends upwardly between the two cylindrical portions of the bearing member 61. Pressed on the outer cylindrical portion of the bearing member 61 is another torque coupling gear 63, which transmits torque to the closure member 17 for closing off the cooking vessel. The second torque gear 63 may be coupled, either directly or through an idler gear, to the shaft 29 of FIGS. 2 and 3, the rotation of which is controlled by the Geneva wheel 27.

The stirrer 14 and the closure blade 17 are fixed to the concentrically mounted cylindrical shafts 18 and 19, respectively. The outer cylindrical shaft 19 is held in position by support block 66, which in turn is slid onto bracket 67 fixed to the underside of lower support plate 22. The inner cylindrical shaft 18 is held in its vertical position within the shaft 19 by the lip and shoulder arrangement at its upper extremity.

The shaft 18 is coupled to the main drive pulley 58 by a linking hex shaft 68, which extends through the center of the coaxially mounted gears and bearings 58 through 63. The inner cylinder of the main drive pulley 58 is formed for mating engagement with the hex shaft 68 so that the hex shaft and the main drive pulley 58 rotate together. The hex shaft is keyed at its lower extremity to the inner cylindrical shaft 18 by key 69 and keyway 70. To facilitate removal of the assembly below the lower support plate 22, the linking shaft 68 is free to slide upward until the key 69 leaves the keyway 70 so as to decouple the linking shaft 68 from the stirrer shaft 18.

The cylindrical shaft 19 for the closure member is keyed to an intermediate cylindrical ring 71, as indicated generally at 72. The ring 71 is, in turn, keyed to the bearing member 61, as indicated generally at 73. Thus, when the torque coupling gear 63 is caused to rotate by the Geneva mechanism of the present invention, the torque imparted is transmitted through the bearing member 61 to the cylindrical ring 71 and to the cylindrical shaft 19. A home position of the lid 17 can be specified by a positional signal from a timing disk and optodetector coupled to shaft 29 as indicated at 75 in FIG. 2. To allow decoupling of the shaft 19, the ring 71 is free to slide in a vertical direction, but in its normal position is urged into its keyed relation to the cylindrical shaft 19 by compression spring 74.

For removal of the shaft assembly below the lower support plate 22, the linking shaft 68 is pulled vertically so that the pin 69 engages the lower end of the intermediate ring 71 and urges that ring upward against the force of spring 74. This action releases both of the keyed couplings to the shafts 18 and 19 so the shaft assembly may be slid off the bracket 67. To lift the shaft 68 for this purpose, a manually operated lever assembly can be coupled to the shaft 68 and can be extended through a port in the housing for access by the user.

As indicated in FIG. 2, the Geneva wheel 26 for controlling the rotation of the dispensing carousel is coupled to a shaft extending vertically through the upper support plate 21. This coupling is independent of the assembly shown in FIG. 7. The dispensing carousel may be driven directly by the shaft 28 or may be offset from that shaft by a conventional gear train.

As described thus far, the linking shaft 68 is coupled so as to rotate whenever the drive motor is activated, and hence will rotate whenever one or the other Geneva wheel is being rotated. In the specific embodiment of the invention used in a cooking apparatus disclosed herein such simultaneous rotation is not disadvantageous and may even be desirable. Since the shaft 68 drives the stirrer, the contents of the vessel will automatically be stirred briefly as new ingredients are dispensed by the carousel or as the lid is closed. In other applications, however, it may be desirable to have independent control over the rotation of the cylindrical shaft 18. For this purpose a rigid linking member 76 may be coupled to the top neck of the shaft 68 for moving the shaft 68 up and down. As illustrated symbolically in FIG. 7, the linking member may be driven up and down on command by solenoid 77. Alternatively, the linking member 76 may be connected to the driver by means of a slip ring at the end of the member 76 and a groove fashioned to receive the slip ring between the support disk 42 and the cam follower 43. Depending upon the scale in the intended application, in view of the normally short distance that the Geneva drive assembly moves between its driving and non-driving positions, it may be necessary to amplify the motion of the linking member 76 through a lever arrangement so as to accommodate the greater distance to be traveled by the shaft 68 if necessary. In either configuration, when lifting the linking shaft 68, the drive motor is preferably stopped momentarily so as to avoid frictional resistance generated by the sideways forces acting on a rotating linking shaft 68. In the configuration in which the linking member 76 is connected to the driver 37, a compression spring may advantageously be added about the neck of the linking shaft 68 between the top of linking member 76 and the head 78 to assist in overcoming friction.

While the above provides a full and complete disclosure of the preferred embodiments of the invention, various modifications and equivalents will occur to those skilled in the art given the benefit of this disclosure. For example, those skilled in the art will recognize that although the cam arrangement disclosed here for raising the drive assembly from its non-driving position to its driving position is convenient and compact, other cam mechanisms or non-cam mechanisms may also be employed. For example, the drive assembly could also be raised by a solenoid-actuated yoke-lift arrangement in which the underside of the driver presents a bearing surface and a yoke extends underneath the driver on either side of the intermediate shaft 31 and engages the bearing surface on command to lift the drive assembly. Accordingly, the invention is not intended to be limited only to the specific examples and embodiments disclosed herein, but is defined by the appended claims.

What is claimed is:

1. In a Geneva drive mechanism for intermittently coupling a shaft or the like to a drive motor, said Geneva drive mechanism including a Geneva wheel coupled to a first rotationally mounted shaft to rotate therewith and a second rotationally mounted shaft coupled to be driven by the drive motor, the improvement comprising:

a drive assembly comprising:
 a driver having a drive pin for engaging said Geneva wheel; and
 a locking ring of generally cylindrical shape having a circular portion of generally circular cross section and a cutout portion adjacent said circular portion formed with a cutout for receiving said Geneva wheel;

said drive assembly being mounted to rotate with said second shaft and to slide between a first, non-driving position and a second, driving position, in said non-driving position said circular portion of said locking ring engaging said Geneva wheel to prevent rotation thereof, and in said driving position said drive pin engaging said Geneva wheel and said cutout portion receiving said Geneva wheel to permit rotation thereof; and selectively engageable means for urging said drive assembly from said non-driving to said driving position, whereby said Geneva wheel and said first shaft are selectively intermittently driven.

2. In a Geneva drive mechanism for intermittently coupling a shaft or the like to a drive motor, said Geneva drive mechanism including a Geneva wheel coupled to a first rotationally mounted shaft to rotate therewith and a second rotationally mounted shaft coupled to be driven by the drive motor, the improvement comprising:

a drive assembly comprising:
   a driver having a drive pin for engaging said Geneva wheel and a surface formed to present a cam follower profile; and
   a locking ring of generally cylindrical shape having a circular portion of generally circular cross section and a cutout portion adjacent said circular portion formed with a cutout for receiving said Geneva wheel;

said drive assembly being mounted to rotate with said second shaft and to slide between a first, non-driving position and a second, driving position, in said non-driving position said circular portion of said locking ring engaging said Geneva wheel to prevent rotation thereof, and in said driving position said drive pin engaging said Geneva wheel and said cutout portion receiving said Geneva wheel to permit rotation thereof; and cam means selectively engageable to contact said cam follower profile for urging said drive assembly from said non-driving to said driving position and for maintaining said drive assembly in said driving position for a duration controlled by said cam follower profile, whereby said Geneva wheel and said first shaft are selectively intermittently driven.

3. The Geneva drive mechanism of claim 2, further comprising timing means for indicating the start of said cam follower profile wherein said cam means is selectively engageable only at discrete times determined by said timing means.

4. The Geneva drive mechanism of claim 3, wherein said timing means comprises a disk coupled to rotate with said second shaft and defining a gap having a position correlated with the start of said cam follower profile, and an optodetector for sensing said gap.

5. The Geneva drive mechanism of claim 2, further comprising biasing means for urging said drive assembly from said driving position to said non-driving position.

6. The Geneva drive mechanism of claim 2, further comprising reset cam means for urging said drive assembly from said driving position to said non-driving position.

7. The Geneva drive mechanism of claim 2 wherein said cam means comprises a solenoid actuated rod member extendable to engage said cam follower profile.

8. The Geneva drive mechanism of claim 2 wherein said first and second shafts are in vertical disposition and said non-driving position of said drive assembly is disposed along said second shaft below said driving position, whereby the return of said drive assembly to said non-driving position is gravity-assisted.

9. A Geneva drive mechanism for intermittently and selectively rotating a plurality of shafts or the like comprising:

first and second rotationally mounted shafts and first and second Geneva wheels respectively coupled thereto to rotate coaxially therewith;

a rotationally mounted intermediate shaft adapted to be coupled to a drive motor;

a drive assembly comprising:
   a driver having a drive pin for engaging said Geneva wheels and defining first and second cam follower surfaces; and
   a locking ring of generally cylindrical shape having a circular portion of generally circular cross section and a cutout portion adjacent said circular portion formed with a cutout for receiving said Geneva wheels;

said drive assembly being mounted on said intermediate shaft to rotate therewith and to slide between a first, non-driving position and a second, driving position, in said non-driving position said circular portion of said locking ring engaging said Geneva wheels to prevent rotation thereof, and in said driving position said drive pin driving a selected on of said Geneva wheels and said cutout portion receiving the Geneva wheel so engaged to permit rotation thereof; and cam means selectively actuable to select and engage one of said cam follower surfaces for urging said drive assembly from said non-driving to said driving position, and thereby selecting one of said Geneva wheels to be driven, and for maintaining said drive assembly in said driving position for a duration controlled by the selected cam follower surface, whereby the selected Geneva wheel, and the respective shaft coupled thereto, are selectively intermittently rotated.

10. The Geneva drive mechanism of claim 9, further comprising timing means indicating the start of said first and second cam follower surfaces for selectively actuating said cam means responsive thereto.

11. The Geneva mechanism of claim 10 wherein said timing means comprises a disk coupled to rotate with said intermediate shaft and defining first and second gaps positioned on said disk in correlation with the start of said first and second cam follower surfaces, and an opto detector for sensing said gaps.

12. The Geneva drive mechanism of claim 9, further comprising biasing means for urging said drive assembly from said driving position to said non-driving position.

13. The Geneva drive mechanism of claim 9, further comprising reset cam means for urging said drive assembly from said driving position to said non-driving position.

14. The Geneva drive mechanism of claim 13, wherein said reset cam means comprises a member defining a stationary cam follower surface positioned to engage said drive pin of said driver and urge said drive assembly toward said non-driving position.

15. The Geneva drive mechanism of claim 9 wherein said shafts are in vertical disposition and said non-driving position of said drive assembly is disposed along said intermediate shaft below said driving position, whereby the return of said drive assembly to said non-driving position is gravity-assisted.

16. The Geneva drive mechanism of claim 15, further comprising a member defining a stationary cam follower surface positioned above said driver to engage said drive pin in said driving position and urge said drive assembly toward said non-driving position.

17. The Geneva drive mechanism of claim 9 further comprising a third shaft and means for selectively coupling said third shaft to said intermediate shaft for continuously driving said third shaft when said intermediate shaft is driven by said motor.

18. In an automatic cooking device of the sort having a cooking vessel, a compartmentalized carousel for holding ingredients to be dispensed into said cooking vessel, a motor for driving said carousel, and a support structure for supporting said carousel and defining a dispensing aperture through which the carousel dispenses ingredients into the cooking vessel, apparatus for selectively advancing the compartments of said carousel into registration with said dispensing aperture comprising:

a first rotationally mounted shaft and a first Geneva wheel coupled thereto to rotate coaxially therewith, said first shaft being further coupled to rotate said carousel;

a rotationally mounted intermediate shaft coupled to said motor;

a drive assembly comprising:

a driver having a drive pin for engaging said Geneva wheel and a surface formed to present a cam follower profile; and a locking ring of generally cylindrical shape having a circular portion of generally circular cross section and a cutout portion adjacent said circular portion formed with a cutout for receiving said Geneva wheel;

said drive assembly being mounted to rotate with said second shaft and to slide between a first, non-driving position and a second, driving position, in said non-driving position said circular portion of said locking ring engaging said Geneva wheel to prevent rotation thereof, and in said driving position said drive pin engaging said Geneva wheel and said cutout portion receiving said Geneva wheel to permit rotation thereof; and cam means selectively engageable to contact said cam follower profile for urging said drive assembly from said non-driving to said driving position and for maintaining said drive assembly in said driving position for a duration controlled by said cam follower profile, whereby said Geneva wheel, and said first shaft, are selectively intermittently driven.

* * * * *